United States Patent
Emanuel et al.

(10) Patent No.: US 8,504,569 B2
(45) Date of Patent: Aug. 6, 2013

(54) APPARATUS AND METHODS FOR PROVIDING ANSWERS TO QUERIES RESPECTIVE OF A USER BASED ON USER UNIQUIFIERS

(75) Inventors: Dotan Emanuel, Herzliya (IL); Sol Tzvi, Herzliya (IL); Tal Elad, Holon (IL)

(73) Assignee: GENIEO Innovation Ltd., Herzliya (IL)

(*) Notice: Subject to any disclaimer, the term of this patent is extended or adjusted under 35 U.S.C. 154(b) by 212 days.

(21) Appl. No.: 12/713,789

(22) Filed: Feb. 26, 2010

(65) Prior Publication Data

US 2010/0299329 A1  Nov. 25, 2010

Related U.S. Application Data

(60) Provisional application No. 61/213,254, filed on May 20, 2009.

(51) Int. Cl.
  *G06F 7/00* (2006.01)
  *G06F 17/30* (2006.01)

(52) U.S. Cl.
  USPC .......................................... 707/737; 707/769

(58) Field of Classification Search
  None
  See application file for complete search history.

(56) References Cited

U.S. PATENT DOCUMENTS

| | | | |
|---|---|---|---|
| 6,052,714 A | 4/2000 | Miike et al. |
| 6,199,067 B1 | 3/2001 | Geller |
| 6,236,978 B1 | 5/2001 | Tuzhilin |
| 6,292,796 B1 | 9/2001 | Drucker et al. |
| 6,317,734 B1 | 11/2001 | Zellweger |
| 6,327,590 B1 | 12/2001 | Chidlovskii et al. |
| 6,424,968 B1 | 7/2002 | Broster et al. |
| 6,498,567 B1 | 12/2002 | Grefenstette et al. |
| 6,513,039 B1 | 1/2003 | Kraenzel |
| 6,895,406 B2 | 5/2005 | Fables et al. |
| 6,964,022 B2 | 11/2005 | Snowdon et al. |
| 6,996,768 B1 | 2/2006 | Elo et al. |
| 7,035,863 B2 | 4/2006 | Kurapati et al. |
| 7,043,475 B2 | 5/2006 | Heer et al. |
| 7,089,216 B2 | 8/2006 | Van Overveld |
| 7,092,936 B1 | 8/2006 | Alonso et al. |
| 7,113,088 B2 | 9/2006 | Frick et al. |
| 7,113,741 B2 | 9/2006 | Chuberre et al. |

(Continued)

OTHER PUBLICATIONS

Hu, Jian et al., "Demographic Prediction Based on User's Browsing Behavior", WWW 2007 / Track: Data Mining; Session: Predictive Modeling of Web Users; May 8-12, 2007, Banff, Alberta, Canada, pp. 151-160.

(Continued)

*Primary Examiner* — Hosain Alam
*Assistant Examiner* — Azam Cheema
(74) *Attorney, Agent, or Firm* — Myers Wolin, LLC

(57) ABSTRACT

A method for providing an answer to an input query respective of a user using a user device comprises collecting data respective of the user by using a plurality of sensors on the user device, wherein the plurality of sensors sense the user activity on the user device; generating a plurality of uniquifiers from the data, wherein each uniquifier of the plurality of uniquifier characterizes the user; evaluating periodically the plurality of uniquifiers; storing at least the evaluated plurality of uniquifiers in a memory of the user device; and responsive to the input query, providing an answer based on at least one evaluated uniquifier of the evaluated plurality of uniquifiers stored in the memory

17 Claims, 7 Drawing Sheets

U.S. PATENT DOCUMENTS

| | | | |
|---|---|---|---|
| 7,162,522 | B2 | 1/2007 | Adar et al. |
| 7,249,124 | B2 | 7/2007 | Sasaki et al. |
| 7,251,687 | B1 | 7/2007 | McCullough |
| 7,287,024 | B2 | 10/2007 | Snowdon et al. |
| 7,996,390 | B2 * | 8/2011 | Freire et al. .................. 707/722 |
| 2003/0028872 | A1 | 2/2003 | Milovanovic et al. |
| 2003/0101024 | A1 | 5/2003 | Adar et al. |
| 2003/0126227 | A1 | 7/2003 | Zimmerman et al. |
| 2003/0236770 | A1 | 12/2003 | Kurapati et al. |
| 2006/0248059 | A1 | 11/2006 | Chi et al. |
| 2007/0073681 | A1 | 3/2007 | Adar et al. |
| 2007/0073682 | A1 | 3/2007 | Adar et al. |
| 2007/0112749 | A1 | 5/2007 | Huang et al. |
| 2007/0239518 | A1 | 10/2007 | Chung et al. |
| 2007/0260624 | A1 | 11/2007 | Chung et al. |
| 2008/0046944 | A1 | 2/2008 | Lee et al. |
| 2008/0162537 | A1 | 7/2008 | Mancini |
| 2008/0168267 | A1 | 7/2008 | Bolen et al. |
| 2008/0183598 | A1 * | 7/2008 | Carr et al. .................. 705/27 |
| 2008/0222132 | A1 | 9/2008 | Pan et al. |
| 2009/0063537 | A1 | 3/2009 | Bonnefoy-Cudraz et al. |
| 2009/0077033 | A1 | 3/2009 | McGary et al. |
| 2009/0125517 | A1 * | 5/2009 | Krishnaswamy et al. ........ 707/6 |
| 2010/0250473 | A1 * | 9/2010 | Porikli et al. .................. 706/12 |

OTHER PUBLICATIONS

Teevan, Jaime et al., "Personalizing Search via Automated Analysis of Interests and Activities", SIGIR '05, Aug. 15-19, 2005, Salvador, Brazil.

Ahn, Jae-wook et al., "Open User Profiles for Adaptive News Systems: Help or Harm?", WWW 2007 / Track: Browsers and User Profiles; Session: Personalization; May 8-12, 2007, Banff, Alberta, Canada, pp. 11-20.

Belkin, Nicholas J., "Helping People Find What They Don't Know", Communications of the ACM, vol. 43, No. 8, (Aug. 2000); pp. 58-61.

Liu, Ying, "Chapter 1: On Document Representation and Term Weights in Text Classification", IGI Global, pp. 1-22; published 2009.

Shafiei, Mahdi et al., "A Systematic Study of Document Representation and Dimension Reduction for Text Clustering", Technical Report CS-2006-05, Jul. 11, 2006, Faculty of Computer Science, 6050 University Ave., Halifax, Nova Scotia, B3H 1W5, Canada.

Kelly, Diane et al., "Implicit Feedback for Inferring User Preference: A Bibliography", ACM SIGIR Forum, vol. 37, Issue 2 (Fall 2003), pp. 18-28.

* cited by examiner

APPARATUS AND METHODS FOR PROVIDING ANSWERS TO QUERIES RESPECTIVE OF A USER BASED ON USER UNIQUIFIERS

CROSS-REFERENCE TO RELATED APPLICATIONS

This application claims the benefit of U.S. provisional application No. 61/213,254 filed on May 20, 2009, the contents of which are herein incorporated by reference.

TECHNICAL FIELD

The present invention generally relates to automatic generation of information about the user interests, and more specifically to systems and methods for providing answers to queries respective of a user, based on user profile information automatically generated on a user's device.

BACKGROUND OF THE INVENTION

Users have today a possibility to reach and be reached by a vast amount of information on a variety of user devices. Such user devices include telephones, hand-held devices, personal computers (PCs), personal digital assistants (PDAs), and the like. The information may be provided to the user in a push mode, that is, information is provided to the user without a specific action on the user's side. In the push mode, information provided in the form of advertisements is most prominent. On the other hand, information may be provided to a user in a pull mode, that is, the user initiates an action that results with providing of information back to the user.

In order for information provided to the user in either a push or pull mode, it is beneficial to characterize the user using some kind of a user profile. This requires monitoring of the user accessing information and attempting to identify patterns that may be then reduced into certain characteristics of the user, usually referred to as a user profile. A created user profile may be then used to better match the information provided to the user based on the user profile. For example, web sites as well as search engines such as Google®, are known to perform such monitoring by tracking the user either by leaving monitors on the user device or by encouraging the user to log on to the web site, thereby identifying the user. Monitors may be implemented using cookies, which are simple pieces of data that are exchanged between a server and a client, thereby affecting the operation of the web server. Regardless of mode of operation the more information the system attempts to collect about the user the greater the security risk for the user's information, predominantly, the user's privacy. An accurate profile outside of the control of a user may lead to significant privacy breaches that may be detrimental to the user.

Merely collecting information from the user in response, for example, to a questionnaire presented to the user, may be significantly lacking due to inaccuracies and/or the fear of the user from a breach of privacy. Prior art attempts to overcome this drawback by generating clusters of user profiles and fitting a user with other profiles generating a more generic profile of a group of people like the user. However, this may suffer from a significant drawback as this is performed typically on per source, for example, a web site, basis, and does not account for the significant variation even within the group.

Thus, there is a need in the art to overcome the deficiencies of the prior art solutions.

SUMMARY OF THE INVENTION

Certain embodiments of the invention include a method for providing an answer to an input query respective of a user using a user device. The method comprises collecting data respective of the user by using a plurality of sensors on the user device, wherein the plurality of sensors sense the user activity on the user device; generating a plurality of uniquifiers from the data, wherein each uniquifier of the plurality of uniquifier characterizes the user; evaluating periodically the plurality of uniquifiers; storing at least the evaluated plurality of uniquifiers in a memory of the user device; and responsive to the input query, providing an answer based on at least one evaluated uniquifier of the evaluated plurality of uniquifiers stored in the memory.

Certain embodiments of the invention further include an apparatus for providing an answer to an input query respective of a user using a user device. The apparatus comprises a plurality of sensors for collecting data respective of the user using the user device; a processing unit for generating a plurality of uniquifiers from the collected data and for periodically evaluating the plurality of uniquifiers, wherein each of plurality of uniquifiers characterizes the user; a memory for storing at least the evaluated plurality of uniquifiers; and a service manager for providing an answer responsive to the input query, the answer being based on the evaluated plurality of uniquifiers stored in the memory.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
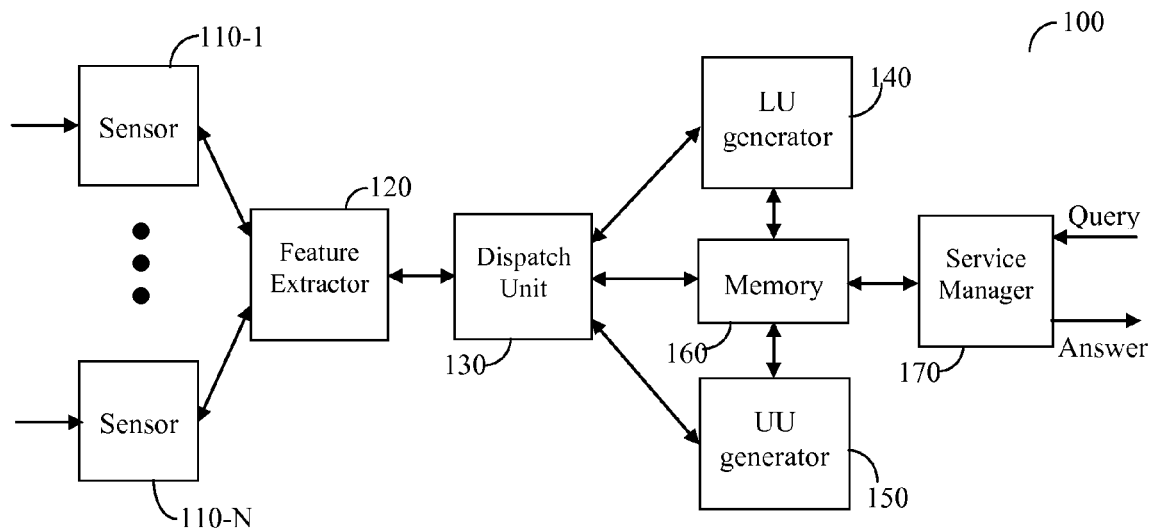
FIG. 1 is a schematic block diagram of an architecture of a system in accordance with the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments of the invention include creation of uniquifiers of a user for the purposes of providing answers to queries respective of the user. An uniquifier is a piece of information that provides unique information about the user of the user device. The user uniquifiers are of two types: labeled and unlabeled, where labeled uniquifiers have a characterizing label and unlabeled uniquifiers, while providing information about the user, cannot be easily associated with a label. Uniquifiers are further accompanied by a confidence level value and current relevancy level value, indicating the current relevancy of the uniquifiers, which changes over time based on the user activity and context. Both values enable the determination of the strength of the answer provided with respect of the user for a query at a point in time. Global uniquifiers may also be used to compute the strength of each global uniquifier given the current user uniquifiers. Furthermore, as the processing is performed on the user's device, privacy and confidentiality is maintained.

FIG. 1 shows an exemplary and non-limiting schematic block diagram of an architecture 100 of a system that can be constructed in accordance with the principles of the invention. The architecture 100 comprises one or more sensors 110-1 through 110-N (collectively referred to as sensors 110) that are used to collect sensory data about the user as the user uses one of the user devices. A user device may be, but is not limited to, a personal computer (PC), a personal digital assistant, a mobile phone, and the like. In one embodiment of the invention the architecture 100 is embedded into a user device, or attached thereto. The sensors 110 may be sensors for sensing a plurality of environment data such as heat, humidity, sound, light conditions, location, and many other such data that may be obtained through the use of such sensors. Some sensors 110 may be sensors that operate as agents on a system, each agent monitoring one or more aspects of a user's usage of the user device. For example, but without limitation, such sensors may include collection of web pages accesses and/or content thereof, documents prepared, modified or viewed by the user, text typed, capturing of misspelled words, operation times and more. In the disclosed architecture such sensors may be added, modified or removed as the need arises and with respect to user behavior when using the user device.

The sensors 110 are coupled to a feature extractor 120 which is a unit capable of extracting the features based on the information provided by the sensors 110. The feature extractor 120 may be coupled, for example, to a sensor that provides location information from a global positioning system (GPS), and therefore be able to extract the information of the specific location that a user is in, not the absolute coordinates but the meaning of these coordinates, for example, if the user is at home, at work, or at a shopping mall. Another sensor 110 may provide time information which can then be correlated by the feature extractor 120 to determine if these are work hours or not depending on the time of day, typical behavior of the user, the location of the user, the travel speed and more. The feature extractor 120 may be further enabled to extract information respective of sensed web pages that the user has visited using the user device providing the terms that appear in the web page as well as other usage related information, including, but not limited to, the time spent on that page, scrolling information when applicable, usage of links available on the page, and more.

The feature extractor 120 therefore reduces the amount of sensory data to manageable segments of data that are then called for by a dispatch unit 130 connected to the feature extractor 120. The dispatch unit 130 is responsible of the periodic feeding of other elements of the architecture 100 with data that is used to develop the uniquifiers which are in the core of the invention. As mentioned above an uniquifier is a piece of information processed by a generator as will be described herein below, and provides a unique information about the user of the user device. The uniquifier is generated responsive of the features extracted by the feature extractor 120 and grouped to provide a specific meaning. An uniquifier may, in some embodiments, be activated or deactivated by a user thereby changing the user profile. Two types of generators of uniquifiers exist in accordance with the invention for this purpose. The first are the labeled uniquifiers (LUs) which are uniquifiers that can be tagged with a label that provides a description of the uniquifier. For example, a LU describing the age of the user, has the label "age" while the LU describing the gender of the user has the label "gender". Other LUs may include, but are not limited to, profession, address or portions thereof, name, height, and so on. In one embodiment of the invention a list of labels may be provided for at least initialization purposes. The labels get associated with respective information (uniquifiers) making them LUs. LUs may also be created as a label is identifiable for an unlabeled uniquifier. It should be appreciated that based on the features extracted by the feature extractor 120 from the data provided by sensors 110, the architecture 100 may provide significant information towards the determination of such user characteristics.

In accordance with an embodiment of the invention a confidence level or levels as to the accuracy of the labeled uniquifier is also provided. For example, in determination of the LU of "age" a plurality of features extracted from a plurality of sensors 110 may be used to associate an age range with a certain confidence level. A second age range may be associated with a lower confidence level which is determined to be over a lesser range. For instance, in the case of the LU "age" an age range may be provided as "18-25" with a confidence level of 95%, and an age range of "20-22" at a confidence level of 85%, The advantage over asking the age from the user is that the user may not provide the correct information for whatever reason, while an analysis of more parameters may lead to a determination that is more accurate. Assessed may be the web sites accessed, the speed of typing, the words used, the location present, and so on, to determine various characteristics of the user. The more sensory data collected the more likely it is that an accurate LU be generated. In accordance with another embodiment of the invention in addition to a confidence level a range of values may be provided.

It should be noted that each LU is generated uniquely and requires special handling by the LU generator 140. For example, the generation of the information associated with the label "age" is orthogonal to the label "gender" that requires a different approach for extraction of its associated information. LUs are stored in memory 160 for further use. It should be noted that LUs are static by nature, or have a very slow and generally predictable change. For example, the LU "age" changes gradually and predictably.

However, not all uniquifiers can have a label and they are referred to herein as unlabeled uniquifiers (UUs) generated by UU generator 150. UUs may be represented in a variety of forms, for example, without limitation, using a vector space model, graphs, and the likes. In one embodiment of the invention the strength of the UU is periodically evaluated. Furthermore, UUs may be periodically generated and updated. Specifically, a similarity between one or more objects (part of a query) and one or more UUs may take place periodically. Objects may include keywords, text, images and the likes. In one embodiment of the invention, a threshold value is used for the determination of a similarity or for the purpose of delaying the conclusion of a similarity until a sufficient level of evidence is collected in accordance with the principles of the invention. UUs and LUs are regularly stored in memory 160 for the purpose of retrieval, modification, and/or elimination. A collection of labeled and unlabeled uniquifiers provides a user profile. In a typical embodiment of the invention the user profile is also kept on the user device and hence provides a higher level of privacy protection than prior art solutions that rely on having user profiles in central databases.

As an example of a creation of the UUs, the following description is provided without limiting the scope of the invention. For example, for sensors 110 that capture documents that the user access, vectors of weighted terms are created for each document. A document may include, but is not limited to, a web page, a document, a spreadsheet, a presentation, and the like. Vectors are then clustered using one or more of clustering processes which are outside the scope of the invention. Each cluster typically contains a plurality of vectors and a cenetroid vector (CV) is then created for each cluster representing the vectors of the cluster. The CV of a cluster is an UU. In one embodiment an UU is further created by grouping of clusters and having a CV that is a more general UU. A threshold parameter is typically used for the determination of clusters. A further parameter may determine the maximum number of clusters to be generated, as well as a parameter for defining a minimum number of vectors within a cluster before such a cluster is determined to be usable for the generation of a CV representing it as an UU. It is noted that while vectors are discussed in the description of the invention that other forms of data representation such as graphs, semantic networks, etc., are possible without departing from the scope of the invention.

UUs are periodically updated as new sensory information is gathered by sensors 110 and features provided by feature extractor 120. Therefore features may also be associated with a weight that causes them to decay over time. This ensures that as clustering is revisited, that older features have a lower weight than more recent features. However, in one embodiment of the invention, upon determination that certain new features have been created, a cluster that is at least similar to a cluster from the past and now a decaying cluster, may revive such a decaying cluster. This may happen due to a periodic interest in a certain topic, for example "football", which increases dramatically during the playing season and may significantly if not totally decrease during the off-season period. However, it is valuable to rapidly return to the knowledge level the system has about the user when return to the previous behavior pattern is identified.

In one embodiment of the invention a glossary of labels is made available. Each label represents a topic, such as "Travel", and is described by a collection of terms represented using the vector space model or any other representation form, such as, without limitation, graphs, semantic nets, and others. These labels may be associated to an UU if an appropriate fit is found between the UU and the label description. In such a case the UU may become a sort of an LU, however, certain aspects pertaining to UUs may be kept for the now labeled UU. This process is internal to the user device that embodies architecture 100 and enables the user to manage certain UUs. Lacking a label a UU is not characterized and therefore cannot be activated or deactivated by a user. When a label is assigned to a UU, the UU is identified as a LU. By providing a label, e.g., "football" the UU is manageable by the user that now understands the characteristic of the uniquifier. An exemplary and non-limiting flowchart is provided in FIG. 7 for additional explanation.

Yet another type of uniquifier is the global uniquifier (GU). This kind of uniquifier is a synthetic uniquifier. The GU is created by assuming certain terms that are expected to be part of a GU. For example, and without limitation of the scope of GUs, a GU "football fan" may describe features that are expected to be found with a large number of football fans. The GU can then be used to check a UU of a user and make a more precise identification of the interests of such a person. In other words, the system supports checking the strength of each GU by comparing it to the current active UUs. Since every GU is related to the specific domain of interest, comparison between GU and UUs allows checking the user's domain of interest. The GU enables an external entity to compare between internal UUs and certain characteristics deemed of interest by the external entity. It can create a GU and then request a query from the user device embodying architecture 100 to assess whether a match or similarity is found between the GU and one or more of the UUs of the user device. An exemplary and non-limiting flowchart is provided in FIG. 8 for additional explanation. In another embodiment of the invention the external entity may provide several GUs that are constantly updated by the system. Then, the external entity may perform queries that use only the GUs in order to provide an answer.

Uniquifiers may be time variant, i.e., either change over time or be relevant at some times and irrelevant of have low-relevancy at other times. For example, a name of a person tends to be time invariant over very long periods of time, while a person's interest may change dramatically during the time of day, between the professional interests of a person and a particular hobby during off-job times. In accordance with an embodiment of the invention, the context of an operation of the user, is also determined. For example, if the system determines that the person is during work hours, possibly between 9 AM and 5 PM during workdays, then the primary concern for data is for information of a technical nature, while during off periods, that specific person is interested in early English poetry, and hence the information to be provided to that person should dramatically change during different periods of time. In another embodiment of the invention uniquifiers are further assigned an aging parameter that determines how fast a uniquifier should age. Some uniquifiers will have a high persistency while others shall be transient by nature. Hence at times certain uniquifiers may be active uniquifiers while others may be inactive uniquifiers and vice versa.

It is the responsibility of a service manager 170 to ensure that the correct context of the user is used. i.e., the active uniquifiers are those that are checked when queries to the system 100 are provided. While in one embodiment the determination of uniquifiers being active or not is binary, i.e., either active or inactive, it is within the scope of the invention that a degree of activeness is associated with a uniquifier. For example, as the workday comes to an end, it is possible that the degree of activeness of uniquifiers that are work associated goes down while leisure time uniquifiers become more active but not in a binary manner.

The collection of uniquifiers may be further used with respect to the context in which a user is at. For example, uniquifiers that generally relate to the user's work time may determine a user profile which is the 'work time profile' of that user. Such a profile may, for example, be independent of some of the user's uniquifiers, such as a specific hobby that is not related to the workday activities of the user. Other user profiles may also be possible. The system 100 is enabled to track the uniquifiers into such user profiles that are used in specific user context. That is, when the user is working the 'work time profile' is used, at least predominately, to determine responses to queries received by the system 100. The use of a temporal user profile allows to more accurately provide information to the user in context to the user's current activities of a user device.

The service manager 170 connected to the memory 160 is used to receive queries respective of the LUs, UUs and GUs and provide answers thereto. For example, a query may request to check whether a certain advertisement is suitable for a male in the age range of 21-28 that lives in New York, N.Y. The purpose of such a query is to assess the likelihood of a user to click on an advertisement, or otherwise determine if the user device will accept that advertisement for display to the user. The advertiser may further require an overall confidence level in excess of 80% on both checked parameters. The service manager 170 then checks the appropriate LUs for "age" and "location", check the confidence level of each, and either accept or reject the offer to provide the advertisement. It should be appreciated that even that no information about the user is provided outside of the user device, an advertiser can have a good level of confidence that the advertisement reaches the right audience. In another example, the user initiates a search and receives in response a plurality of possible web pages which can be checked against the UUs and/or GUs of the user and present to the user only those links, or web pages, which match the active UUs of the user. All that is done without private information of the user leaving the user device. In one embodiment of the disclosed invention the more relevant links are marked, highlighted, emphasized or otherwise made more visibly noticeable by the user. It should be noted however, that while the system is targeted to provide a high-level of privacy to a user of the apparatus and the methods thereof, that there are other embodiments of the invention that may include partial or full implementation on a server. Such implementations do not depart from the spirit of the disclosed invention and are specifically included herein.

Figure 2:
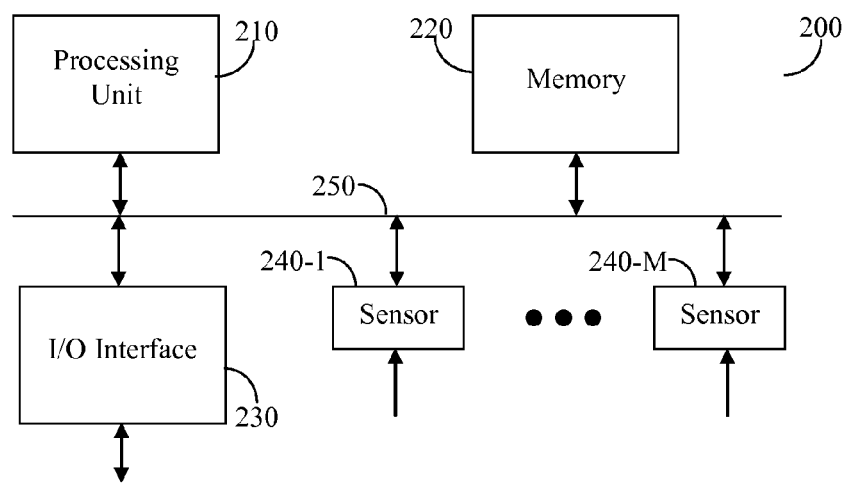
FIG. 2 is a schematic block diagram of a system implementing the architecture.

FIG. 2 depicts an exemplary and non-limiting schematic block diagram of a system 200 implementing the architecture 100. The system 200 comprises a processing unit 210, a memory 220, an input/output (I/O) interface 210, and plurality of sensors 240. The processing unit 120, the memory 220, the I/O interface 230 and the sensors 240 are connected to a bus 250 that enables the exchange of data between the various elements of the system 200. The sensors 240 are the physical sensors described hereinabove. Virtual sensors may be implemented in software or firmware stored in the memory 220, and becoming operative when sequences of instructions are executed by the processing unit 210. Similarly, the feature extractor 120, the dispatch unit 130, the LU generator 140, the UU generator 150 and the service manager 170 (shown in FIG. 1), may be implemented in software, firmware or combination thereof in this system 200, and becoming operative when sequences of instructions are executed by the processing unit 210.

Figure 3:
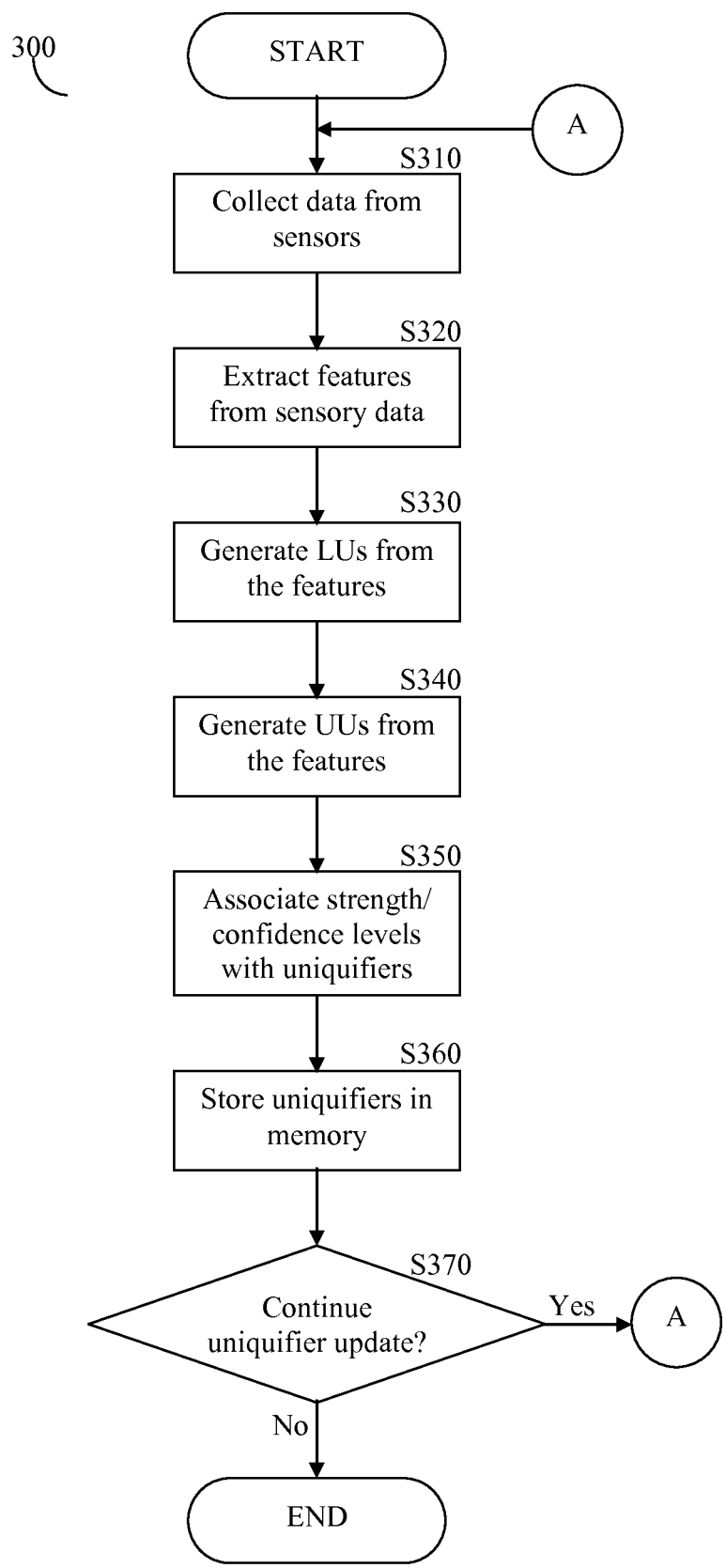
FIG. 3 is a flowchart depicting the creation of a user profile in accordance with the principles of the invention.

The operation of the architecture 100 and the corresponding system 200 may be further understood with respect to FIG. 3 where an exemplary and non-limiting flowchart 300, depicting the creation of a user profile in accordance with the principles of the invention, is presented. In S310 data is collected by the sensors 110. In S320 features are extracted from the data collected from the sensors 110 by the feature extractor 120. In S330 LUs are generated by the LU generator 140 responsive of at least some of the features extracted by the feature extractor 120 and dispatched by the dispatch unit 130. A more detailed description of S330 is provided with respect to FIG. 4 below. In S340 UUs are generated by the UU generator 150 responsive of at least some of the features extracted by the feature extractor 120 and dispatched by the dispatch unit 130. A more detailed description of S340 is provided with respect to FIG. 5 below. An exemplary but non-limiting description for creation of UUs was discussed hereinabove. In S350 confidence levels are associated with LUs and, potentially, strengths values with UUs. In S360, the uniquifiers are stored in memory. In S370 it is checked whether it is necessary to continue the uniquifiers update and/or generation and if so execution continues with S310; otherwise, execution terminates.

Figure 4:
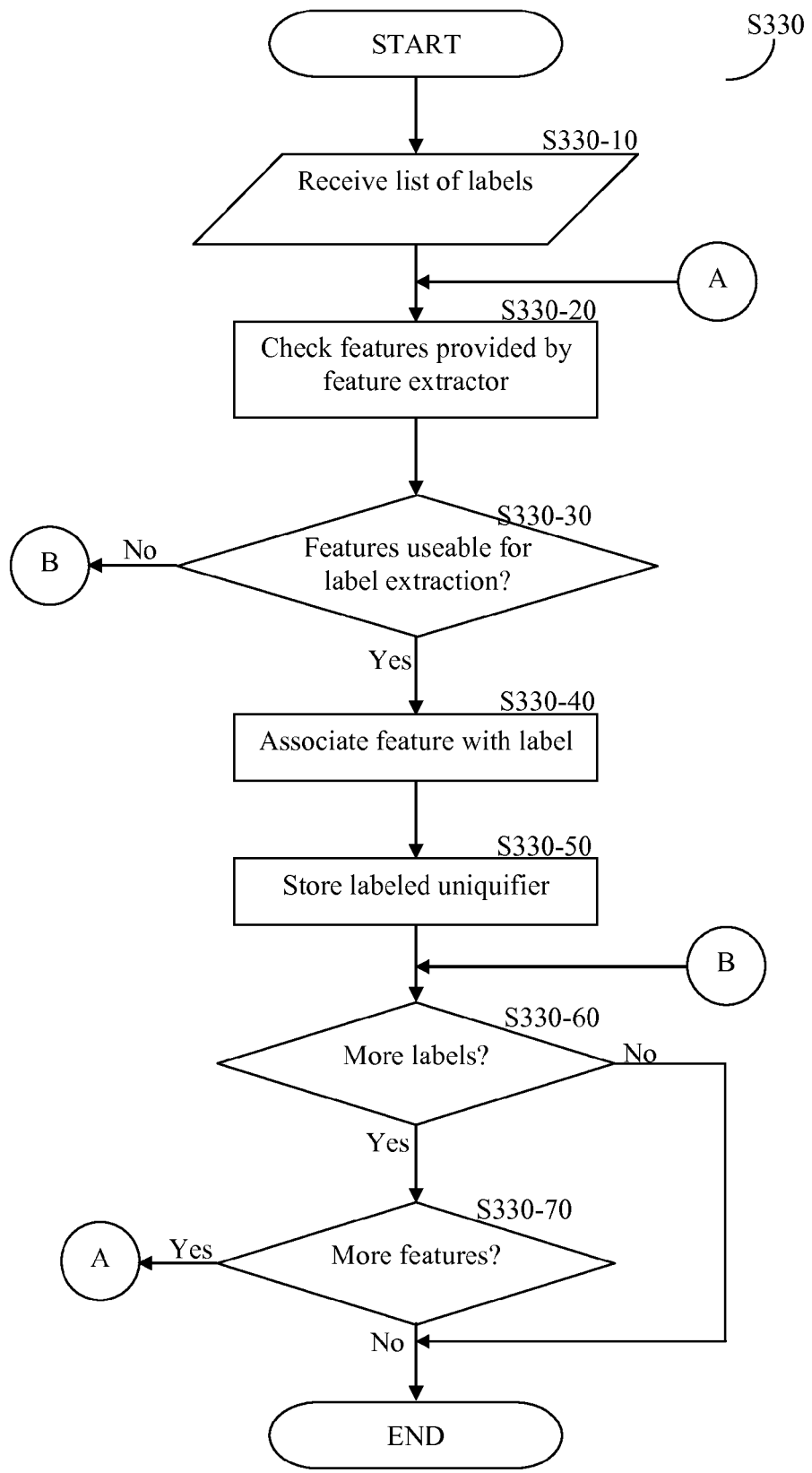
FIG. 4 is a flowchart depicting the filling of content of a labeled uniquifier (LU)

FIG. 4 shows an exemplary and non-liming flowchart S330 depicts the filling of content of the LUs. In S330-10 a list of labels that need to be matched with information is provided, for example to the LU generator 140. In S330-20 features provided by the feature extractor 120 are checked for information and/or clues for identification of a potential association with a label in the list. In S330-30 it is checked if the feature(s) suffice or otherwise useable for the purpose of activating a mechanism for extraction of label information, and if so execution continues with S330-40; otherwise, execution continues with S330-60.

In S330-40 the feature(s) that was found to match with a label from the list of labels is associated with that label. As noted above, the association may require a specific handling on a per label basis. For example, the "age" label may be determined accurately assuming a response by a user when filling out a form concerning the user's age. However, this age may or may not be correct and hence other features may be used to further determine an age range that is derived from a plurality of features that enable a conclusion, at a specific level of confidence, of a possible age range of that user. That range may include the age provided by the user or, may be outside of that range. This could be used, for example, to prevent sending age restricted information to youngsters attempting to pose as adults eligible to receive such materials.

In S330-50 the LU is stored in a memory, for example, the memory 160. In S330-60 it is checked whether there are more labels that need to be matched with features, and if so execution continues with S330-70; otherwise, execution terminates. In S330-70 it is checked whether there are more features that can be provided by the feature extractor 120, and if so execution continues with S330-20; otherwise execution terminates. It should be noted though that the system may periodically return to the determination of LUs as may be necessary and as new or more updated features are collected. It is further possible to have updates to the list of labels that may result in a need to generate and/or update the LUs.

Figure 5:
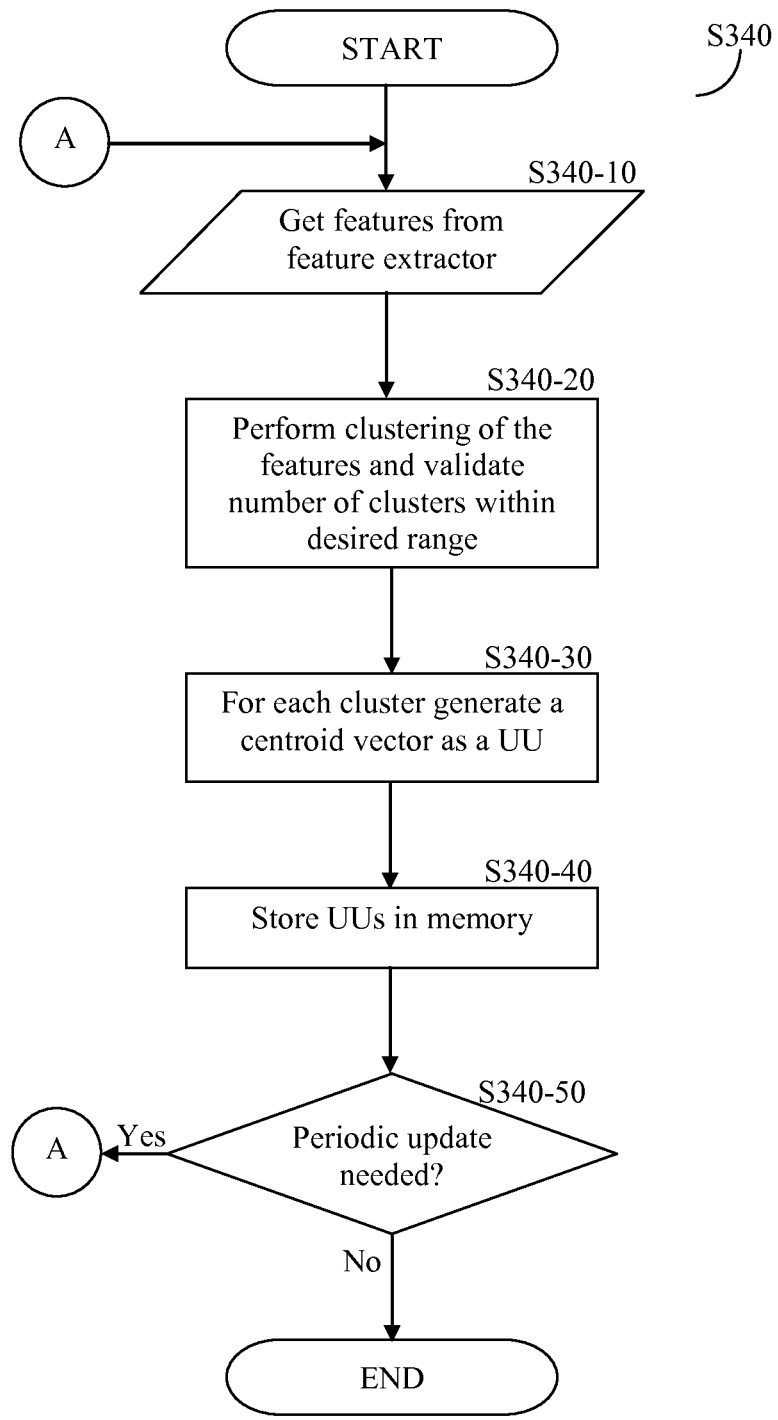
FIG. 5 is a flowchart depicting the creation of a unlabeled uniquifier (UU)

An exemplary and non-limiting flowchart S340 that depicts the creation of UUs is shown in FIG. 5. In S340-10, features are received from the feature extractor 120. In S340-20 a clustering process of the features is initiated for the creation of a plurality of clusters of the features. In one embodiment of the invention the number of clusters is a predefined number. If more clusters than the predefined number are created, then a selection process may take place to select the most appropriate or fit clusters. In another embodiment, a threshold parameter for creating a cluster is provided that reduces the number of clusters the UU generator 150 attempts to create. In S340-30, a CV is generated for each cluster, the CV representing a cluster being an UU for the user of the user device. In S340-40 the UUs are stored in a memory, for example, the memory 160. In S340-50 it is checked if there is a need to periodically update the UUs, and if so execution continues, potentially after a present delay, with S340-10; otherwise, execution terminates. It should be noted that in a typical embodiment of the invention a periodic update of the UUs should take place as new features are collected by the feature extractor 120.

Figure 6:
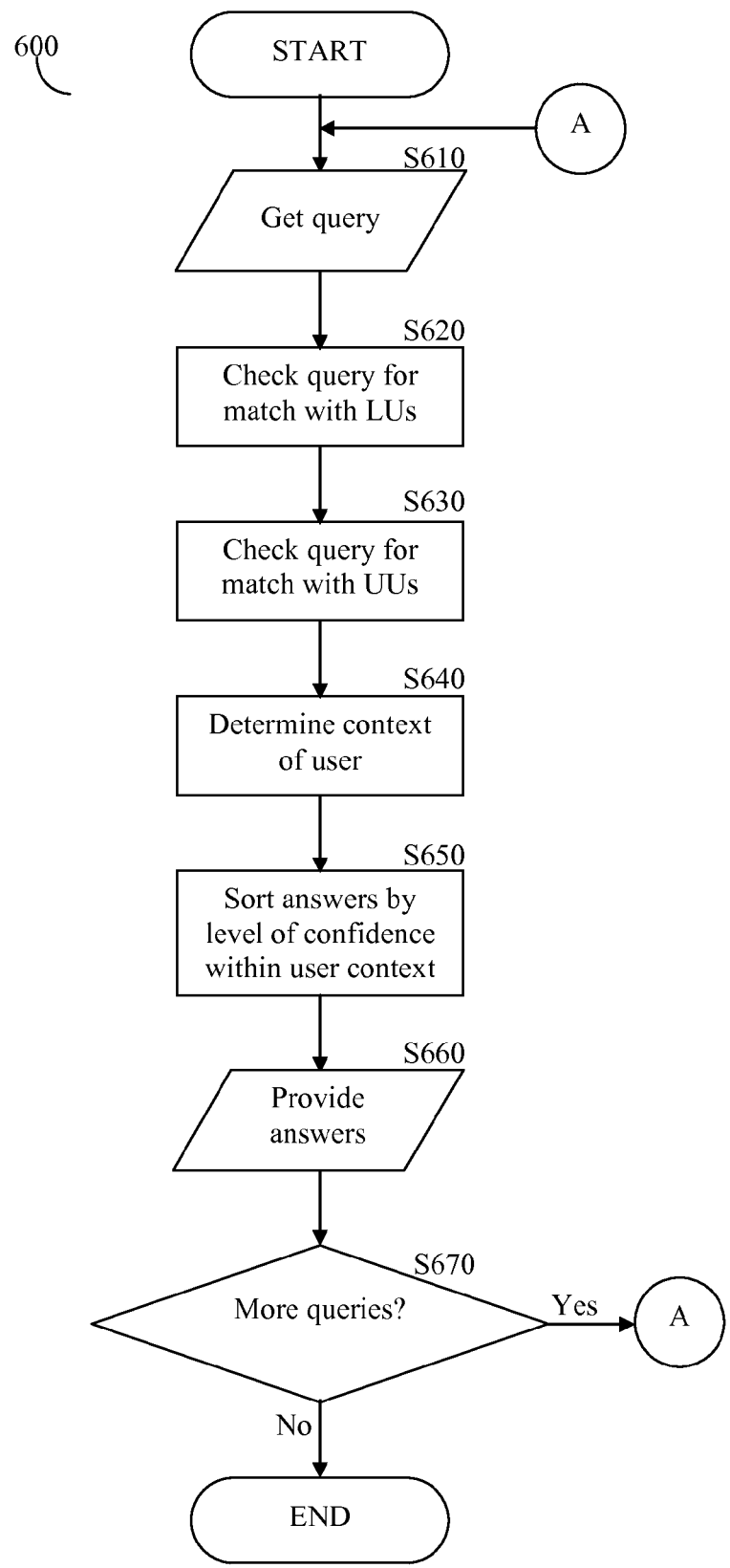
FIG. 6 is a flowchart depicting the flow from a query to an answer in accordance with the principles of the invention.

To further appreciate the operation of the architecture 100 and the corresponding system 200 further reference is made to FIG. 6 where an exemplary and non-limiting flowchart 400, that depicts the flow from a query to an answer in accordance with the principles of the invention. In S610 a query is received by the service manager 170. In S620 the query is checked for equality and/or match with LUs and is S630 it is checked for match with UUs and possibly GUs if defined. While for simplicity purposes this is described with respect to S620 and S630 it should be noted that, for example, a location of a user may be determined through both a LU and a UU, but also by only one type, either a LU or UU, as the case may be.

In S640 the context of the user may be determined. The context of the user may be helpful as the user may be looking for different things when the context is a work related context, versus a context of a holiday at another location of the world, and so on. By adding the context it is possible to better provide content to the user. For example, if the user watched a video clip about fishing the search for "salmon" may most likely be in the context of a fishing expedition rather than a cooking spree. Hence, by determining the context in which a user is in, the context related user profile may be used for the purpose of responding to queries. In S650 the answers received may be sorted by level of confidence, strength and/or context. In S660 the answers may be provided, or acted upon as may be necessary. Examples for queries and answers returned in response to the queries are provided below. In S670 it is checked whether additional queries are to be presented and if so execution continues with S610; otherwise, execution terminates. In one embodiment of the invention queries are received by the service manager 170 and stored in the memory 160. Periodically the query is revisited and checked against uniquifiers of the user stored in the memory 160 of the user device. Upon finding a match or an answer, the response is sent to the requesting entity. In one embodiment of the invention, after providing the answer the query is deleted from the memory 160, in another embodiment it remains in the memory and when applicable retrieved and checked for possible matches. This allows a delayed query process where answers are provided respective of the user using the user device asynchronously to the time the query was submitted to the system 100.

Figure 7:
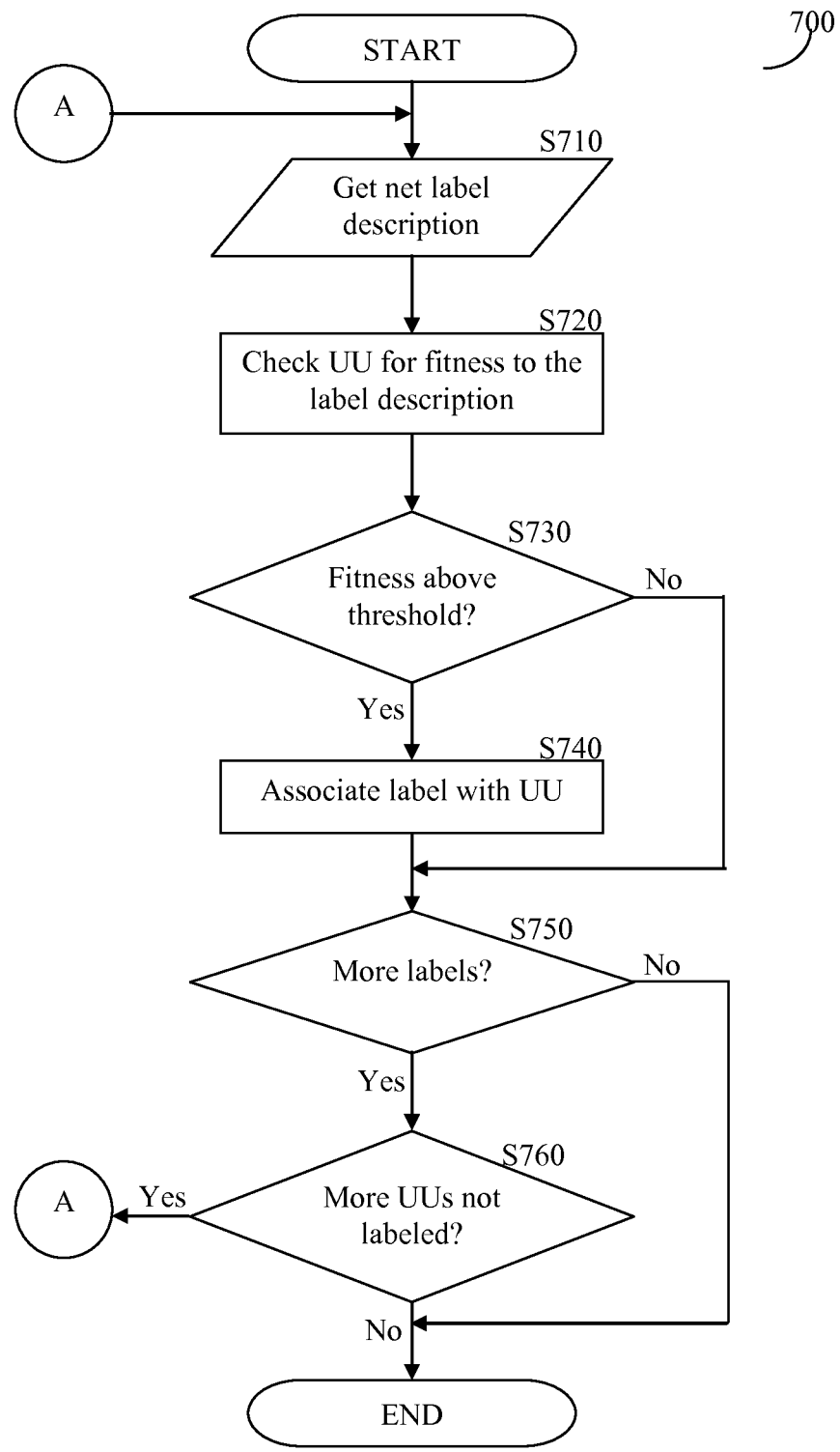
FIG. 7 is a flowchart depicting the process of labeling of an UU.

FIG. 7 shows an exemplary and non-limiting flowchart 700 depicts the process of labeling of an UU. In S710 a description that is associated with a potential label for a UU are received. They may be preloaded in memory or provided external to the system 200. In S710 the UU generator 150 checks if the UU fits the description provided for the label. In S730 it is checked if the fitness level is above a predetermined threshold, and if so execution continues with S740; otherwise, execution continues with S750. In S740 the label is associated with the UU, now providing a label to the UU, as also explained above. It should be noted that this label is a fuzzy label as it is not guaranteed to be fully precise. For example, the label for age is precise because it only uses information that relates to the label "age", however, determining the label "football" to a UU may not necessarily be a precise determination, and even linguistically can be confused between "American football" and "European soccer". In S750 it is checked whether more labels are available, and if so execution continues with S760; otherwise execution terminates. In S760 it is checked whether there are more UUs not currently labeled and if so execution continues with S710; otherwise execution terminates. It should be noted that this process may be repeated periodically as additional features are extracted by the feature extractor 120 causing the UU generator 150 to potentially create new UUs or update current ones.

Figure 8:
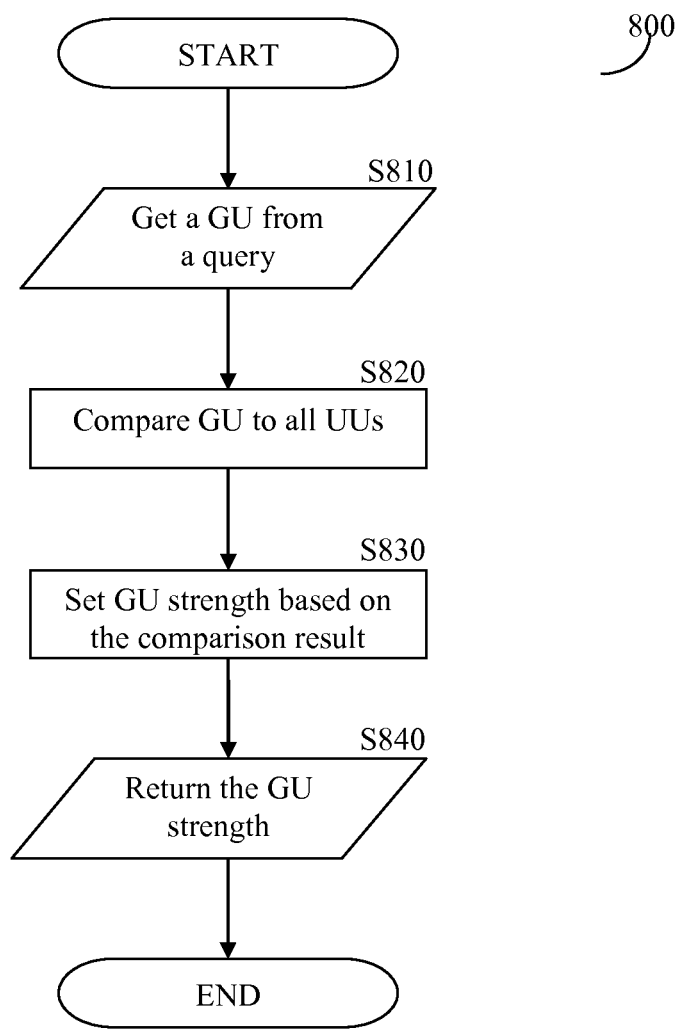
FIG. 8 is a flowchart depicting the process of comparing a global uniquifier (GU) to UUs.

FIG. 8 depicts an exemplary and non-limiting flowchart 800 showing the process of comparing a global uniquifier (GU) to UUs. In S810 a GU is received by the system 200, for example by means of a query provided to the service manager 170. In an alternative embodiment the GUs may be defined by the service manager and stored in the system for continues comparison with the UUs. In S820 the GU is compared to all UUs and the strength of the similarity between the GU and the UUs is determined in S830. In S840 the GU strength is returned to the query issuer. If all the GUs are stored in advance into the system, the process described in FIG. 8 is continuously performed in order to constantly update the GUs. In this case the query may relate to GUs current strength.

According to the invention a query may be provided from an external system to the system of the user device. The uniquifiers need not be provided to the entity presenting the query thereby increasing the security and confidentiality level of the user's information without sacrificing the ability to provide accurate information. In fact, systems requiring information from a user to be transferred to a different system may often not be able to retrieve such information about the user as the user declines to provide such information external of the user system. The query received may be, for example and without limitation, a request to check if a specific web page would be of interest to the user using the user device. A vector of weighted terms may be created for that page, either by the querying entity or by the user device and then compared to the plurality of UUs stored in the memory of the user device. Then, an answer is returned indicating if a match and/or equality is found, it is determined that the page may be displayed to the user or otherwise, such is declined. The answer may be also a score indicating the level of interest the user is expected to have for the checked web page. Information about accepting or rejecting such web page may or may not be provided to the entity posing the request depending on confidentiality level setting made by the user of the user device.

Most preferably, the principles of the invention are implemented as any combination of hardware, firmware and software. Moreover, the software is preferably implemented as an application program tangibly embodied on a program storage unit or computer readable medium. One of ordinary skilled in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A method for providing an answer to an input query respective of a user using a user device, comprising:
collecting data respective of the user by using a plurality of sensors on the user device, wherein the plurality of sensors sense the user activity on the user device;
generating a plurality of uniquifiers from the data, wherein each uniquifier of the plurality of uniquifiers characterizes the user, wherein an uniquifier is at least a global uniquifier;
evaluating periodically the plurality of uniquifiers, wherein each of the plurality of uniquifiers are further accompanied by a confidence level value and a current relevancy level value both indicating the current relevancy of the plurality of uniquifiers, wherein the relevancy of the plurality of uniquifers changes over time based on the user activity and context of a usage of the user device;
storing at least the evaluated plurality of uniquifiers in a memory of the user device;
responsive to the input query, providing an answer based on at least one evaluated uniquifier of the evaluated plurality of uniquifiers stored in the memory, wherein the input query queries whether a certain content is likely to be accessed by the user if displayed on the user device; creating a plurality of clusters from at least a portion of the data; finding a centroid vector for each of the plurality of clusters; periodically reclustering at least a portion of the data into new clusters; and finding a centroid vector for each of the new clusters.

2. The method of claim 1, wherein the answer is returned without sharing the least one evaluated uniquifier with a source of the input query.

3. The method of claim 1, wherein evaluating periodically the plurality of uniquifiers further comprises:
identifying the plurality of uniquifiers as at least one of labeled uniquifiers and unlabeled uniquifiers.

4. The method of claim 1, further comprises:
attaching a confidence level value to at least one of the labeled uniquifiers.

5. The method of claim 1, further comprises:
attempting periodically to identify a label for at least one of the unlabeled uniquifiers.

6. The method of claim 1, further comprises:
identifying a context of the user when operating the user device.

7. The method of claim 1, wherein the query is a delayed query.

8. The method of claim 7, further comprises:
storing the delayed query in the memory; and
periodically checking the memory for providing an answer responsive of the delayed query.

9. The method of claim 1, is executed by computer executable code stored in computer readable medium.

10. An apparatus for providing an answer to an input query respective of a user using a user device, comprising:
a plurality of sensors for collecting data respective of the user using the user device;
a processing unit for generating a plurality of uniquifiers from the collected data and for periodically evaluating the plurality of uniquifiers, wherein each of the plurality of uniquifiers characterizes the user, wherein the processing unit is further configured to generate at least an unlabeled uniquifier by creating a plurality of clusters from at least a portion of the collected data, finding a centroid vector for each of the plurality of clusters; periodically reclustering at least a portion of the data into new clusters; and finding a centroid vector for each of the new clusters, wherein an uniquifier is at least a global uniquifier;
a memory for storing at least the evaluated plurality of uniquifiers, wherein each of the plurality of uniquifiers are further accompanied by a confidence level value and a current relevancy level value both indicating the current relevancy of the plurality of uniquifiers, wherein the relevancy of the plurality of uniquifers changes over time based on the user activity and context of a usage of the user device; and
a service manager for providing an answer responsive to the input query, the answer being based on the evaluated plurality of uniquifiers stored in the memory, wherein the input query queries whether a certain content is likely to be accessed by the user if displayed on the user device.

11. The apparatus of claim 10, further comprising:
an input interface for providing the input query to the apparatus; and
an output interface for returning the answer.

12. The apparatus of claim 10, wherein the query is a delayed query.

13. The apparatus of claim 12, wherein the delayed query in stored in the memory and wherein the stored delayed query is periodically checked for providing an answer responsive of the delayed query.

14. The apparatus of claim 10, wherein the uniquifiers are at least one of labeled uniquifiers, global uniquifiers, and unlabeled uniquifiers.

15. The apparatus of claim 14, wherein the confidence level value is assigned to at least one of the labeled uniquifiers.

16. The apparatus of claim 14, wherein the apparatus periodically identifies a label for at least one of the unlabeled uniquifiers.

17. The apparatus of claim 14, wherein the processing unit comprises:
a feature extractor for extracting at least one feature for data collected by the plurality of sensors;
a dispatch unit connected to the feature extractor;
a labeled uniquifier generator for periodically receiving information regarding extracted features stored in the memory; and
an unlabeled uniquifier generator for periodically receiving information regarding extracted features stored in the memory, wherein the labeled uniquifier generator and the unlabeled uniquifier generator are connected to the dispatch unit and periodic fed by the dispatch unit.

* * * * *